United States Patent [19]

Smith

[11] 3,823,577
[45] July 16, 1974

[54] FLEXIBLE COUPLING
[75] Inventor: Thomas R. Smith, Newton, Iowa
[73] Assignee: Pyramid, Inc., Newton, Iowa
[22] Filed: Apr. 17, 1973
[21] Appl. No.: 352,041

Related U.S. Application Data
[62] Division of Ser. No. 113,259, Feb. 8, 1971, abandoned.

[52] U.S. Cl. ............... 64/11 R, 161/190, 161/219
[51] Int. Cl. .............................................. F16d 3/17
[58] Field of Search .......... 64/11 R, 27 AM, 13, 14; 161/219, 190

[56] References Cited
UNITED STATES PATENTS
2,969,656  1/1961  Reuter ............................. 64/11 R
3,218,215  11/1965  Ackterhof et al. ............... 161/219 X
3,388,032  5/1968  Sanders ........................... 161/190 X Primary Examiner—Samuel Scott
Assistant Examiner—Randell Heald
Attorney, Agent, or Firm—Richard L. Ward

[57] ABSTRACT

A flexible coupling including a flexible polyurethane elastomer central member bonded to the face of rigid driving and driven hubs formed, in one embodiment, of a polycarbonate material and a method of making the flexible coupling.

2 Claims, 2 Drawing Figures

PATENTED JUL 16 1974

3,823,577

THOMAS R. SMITH
*INVENTOR.*

BY

*Richard L. Ward*
*AGENT.*

FLEXIBLE COUPLING

This a division of application Ser. No. 113,259 filed Feb. 8, 1971, now abandoned.

BACKGROUND OF THE INVENTION

1. Field of the Invention

This invention relates to a coupling device and, more particularly, to an improved unitary flexible coupling device.

2. Description of the Prior Art

Flexible couplings having a resilient rubber member bonded to driving and driven members or hubs have been shown in the prior art. Difficulty in obtaining a good bond between the rigid and flexible members and deterioration of the rubber in certain operational environments has been a continuing problem. The use of polyurethane will help overcome the environment problems but will also perhaps increase the problem of bonding the flexible member to the rigid driving and driven members such as metal hubs. Furthermore, at least most of the prior art flexible couplings have included an essential mechanical interlocking of the elastomeric material to the rigid hubs or have provided auxiliary members to achieve a capacity for torque transmission.

SUMMARY OF THE INVENTION

It is therefore an important object to provide an improved unitary flexible coupling and a method for making it.

It is a further object to provide an improved unitary flexible coupling including integrally joined polyurethane and polycarbonate members.

It is still a further object of this invention to provide an improved unitary flexible coupling including a polyurethane flexible portion bonded to a rigid metallic hub by an improved method.

It is yet a further object of the instant invention to provide an improved unitary flexible coupling including a polyurethane flexible portion bonded to a pair of rigid polycarbonate hubs by molding the polyurethane directly to the polycarbonate.

The instant invention achieves these objects in a flexible coupling formed, in one embodiment, by bonding a flexible polyurethane material directly to a pair of rigid polycarbonate hubs.

Operation of the device and further objects and advantages thereof will become evident as the description proceeds and from an examination of the accompanying sheet of drawings.

BRIEF DESCRIPTION OF THE DRAWINGS

The drawings illustrate a preferred embodiment of the invention with similar numerals referring to similar parts throughout the several views wherein.

DESCRIPTION OF THE PREFERRED EMBODIMENT

Figure 1:
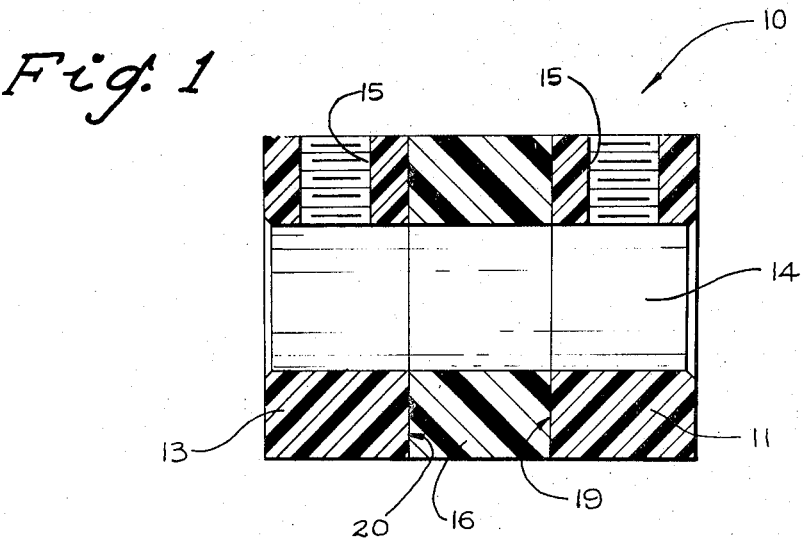
FIG. 1 shows a cross section view of a flexible coupling comprising the instant invention.

Referring to FIG. 1 there is shown a generally cylindrical unitary flexible coupling 10 including a rigid driving hub 11 and a rigid driven hub 13. The hubs 11 and 13 are generally identical and interchangeable and may be formed, for example, of a rigid polycarbonate material. Each of the hubs 11 and 13 defines a central bore 14 for receiving a shaft (not shown) and also includes a threaded hole 15 to receive a set screw (not shown) to fix the hubs 11 and 13 to the driving and driven shafts.

The flexible intermediate member 16, composed of a polyurethane material, extends between and is securely bonded to the axially facing surfaces 19 and 20 of the hub members 11 and 13, respectively, to provide the unitary flexible coupling 10. The polyurethane elastomeric material may be molded directly to the facing surfaces 19 and 20 of the polycarbonate hubs 11 and 13 to provide the integral bond.

The unitary polycarbonate-polyurethane coupling 10 is fabricated by a process in which the hubs 11 and 13 are first placed in a mold and retained relatively fixed to each other with the bores substantially aligned and concentric as in FIG. 1. The spaced-apart facing surfaces 19 and 20 and the mold define a cavity for receiving the polyurethane material.

Polyurethane at approximately 325°–425° F. is introduced into the cavity by hand pouring or by pressure injection, for example, so that the polyurethane fills the space between the juxtaposed polycarbonate surfaces 19 and 20. The mold and/or hub retaining device may include a core pin to provide a continuous axially extending opening through the coupling as in FIG. 1 or include a pair of pins extending only into the hubs 11 and 13 to provide a generally solid polyurethane member without a central opening depending on the requirements of the particular coupling application.

No pretreatment of the polycarbonate surfaces 19 and 20 is required to achieve a bond of the polyurethane member 16 with the polycarbonate hubs 11 and 13 that is capable of transmitting considerable torque. It is also unnecessary to preheat the hubs 11 and 13 or to subject the coupling 10 to a carefully controlled cooling process. No mechanical interlocking structures are necessary in practicing the instant invention, but the addition of such structures to a coupling otherwise falling within the scope of the claims would not, of course, avoid infringement.

The hardness of the polyurethane is preferably in the range of 50–95 Shore A with the specific hardness depending on the particular coupling application. Similarily, the size of the bonding surfaces 19 and 20 and the axial length of the polyurethane member 16 may be varied to provide the desired torque capacity and degree of flexibility or misalignment capability.

Figure 2:
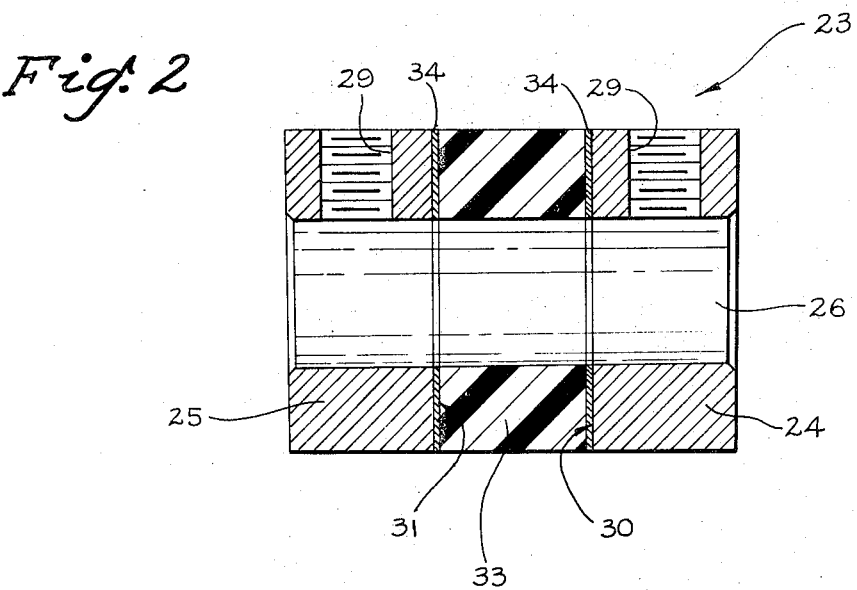
FIG. 2 shows a cross section view of a flexible coupling comprising an alternate embodiment of the instant invention.

In an alternate embodiment a flexible coupling 23, as shown in FIG. 2, includes driving and driven hubs 24 and 25 that are similar to the polycarbonate hubs 11 and 13 of FIG. 1 but are formed of a metallic material such as aluminum. The hubs 24 and 25 include a bore 26 for receiving a shaft (not shown), a threaded hole 29 for receiving a set screw (not shown), and axially facing surfaces 30 and 31 as with the embodiment of FIG. 1.

The intermediate resilient portion 33 is polyurethane, but since polyurethane does not bond to metal with sufficient strength to transmit torque, a layer of adhesive 34 is disposed between each of the metal hubs 24 and 25 and the polyurethane 33. The adhesive layer 34, the thickness of which is exaggerated in FIG. 2 for pictorial clarity, may be a special purpose adhesive such as "Thixon AB-1153" supplied by the Whittaker Corporation. In the fabrication of the coupling FIG. 2, the bonding surfaces 30 and 31 of the hubs 24 and 25 are coated with the adhesive 34 and dried prior to bonding of the metallic hubs 24 and 25 to the polyurethane intermediate portion 33.

Essentially the steps in making the flexible coupling 23 of FIG. 2 are: applying the adhesive 34 to hub surfaces 30 and 31; assembling the coupling 23 including the placing of polyurethane material 33 between the hubs 24 and 25; and applying heat to effect a bond of the polyurethane element 33 to the metallic hubs 24 and 25. The step of introducing polyurethane into the space between the hubs 24 and 25 is best achieved by placing the hubs in a mold and molding the polyurethane element 33 in place so as to obtain proper mating of the elements even though bonding is insufficient to achieve torque transmission.

The step of heating may be achieved by one of the following methods:

a. The hubs 24 and 25 of an assembled coupling 23 may be quickly heated to approximately 400°–500° F. and then rapidly cooled.

b. An assembled coupling 23 may be heated at 290° F. for one hour and then cooled in an ambient environment.

c. The hubs 24 and 25 may be preheated to approximately 350°– 400° F. prior to the molding of the polyurethane 33 into the space between the hubs.

By the above process and using one of these heating methods, an integral bond is produced between the metal hubs 24 and 25 and the polyurethane intermediate member 33.

In summary, this invention provides an improved flexible coupling and method of fabrication. The unitary coupling is low cost yet capable of accommodating both parallel and angular misalignment and dampening vibrations. The absence of relatively movable parts obviates operating noise and the polyurethane resilient member is long life because of its high resistance to corrosion and deterioration in most operating environments.

In the foregoing drawings and specification, there has been set forth a preferred embodiment of the invention and although specific terms are employed, these are used in a generic and descriptive sense only and not for purposes of limitation. Changes in form and the proportion of parts as well as the substitution of equivalents are contemplated as circumstances may suggest or render expedient without departing from the spirit or scope of this invention.

I claim:

1. A flexible drive coupling for drivingly connecting a pair of rotatable shafts comprising: first and second preformed hubs each including an annular portion defining a central opening for receiving a shaft and formed of relatively rigid polycarbonate material, said first hub having a transversely extending surface generally facing and aligned with a corresponding transversely extending surface of said second hub in spaced juxtaposition thereto, said facing surfaces being generally annular plane surfaces free of mechanically interlocking projections, and a relatively resilient molded-in-place polyurethane member integrally connected to the mutually facing surfaces of said first and second hubs for drivingly connecting one with the other and forming with the hubs said flexible coupling as a unitary structure.

2. A flexible drive coupling as defined in claim 1 wherein said hubs and connecting polyurethane member are annular and comprise a cylindrical coupling.

* * * * *